(12) United States Patent
Pesetsky et al.

(10) Patent No.: US 9,399,182 B2
(45) Date of Patent: Jul. 26, 2016

(54) PARTICLE SEPARATOR

(75) Inventors: Serge Pesetsky, Shenzhen (CN); Chad J. Caparros, Shenzhen (CN); Chuan Hui Fang, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 752 days.

(21) Appl. No.: 13/543,023

(22) Filed: Jul. 6, 2012

(65) Prior Publication Data

US 2013/0008840 A1 Jan. 10, 2013

(30) Foreign Application Priority Data

Jul. 6, 2011 (CN) .......................... 2011 1 0188389

(51) Int. Cl.
| | |
|---|---|
| *B04C 5/08* | (2006.01) |
| *B04C 5/28* | (2006.01) |
| *B01D 21/26* | (2006.01) |
| *B04C 7/00* | (2006.01) |
| *B04C 9/00* | (2006.01) |
| *F24D 19/00* | (2006.01) |

(52) U.S. Cl.
CPC ................ *B01D 21/267* (2013.01); *B04C 5/08* (2013.01); *B04C 5/28* (2013.01); *B04C 7/00* (2013.01); *B04C 9/00* (2013.01); *F24D 19/0092* (2013.01); *B01D 2221/02* (2013.01); *B04C 2009/002* (2013.01)

(58) Field of Classification Search
CPC .............. B04C 5/08; B04C 5/13; B04C 5/26; B04C 5/28; B04C 7/00; B04C 9/00; B04C 11/00; B04C 2009/002; B04C 5/185; B01D 21/267; B01D 2221/02; B01D 21/0009; F24D 19/0092

USPC ............... 210/512.2; 209/711, 712, 728, 729; 55/459.1

See application file for complete search history.

(56) References Cited

U.S. PATENT DOCUMENTS

| | | | | |
|---|---|---|---|---|
| 2,377,524 A | * | 6/1945 | Samson et al. ................ | 209/729 |
| 2,530,181 A | * | 11/1950 | Schilling ................ | B04C 5/103 |
| | | | | 209/728 |
| 2,550,341 A | * | 4/1951 | Fontein .................... | B04C 5/24 |
| | | | | 209/172.5 |
| 2,671,560 A | | 3/1954 | Fontein et al. | |
| 2,734,630 A | | 2/1956 | Van Der Wal | |
| 3,166,496 A | * | 1/1965 | Kelsall ...................... | B03B 9/00 |
| | | | | 209/209 |
| 4,148,723 A | * | 4/1979 | Mozley ........................ | 209/726 |

(Continued)

FOREIGN PATENT DOCUMENTS

| | | |
|---|---|---|
| CN | 101254083 A | 9/2008 |
| GB | 1090978 A | 11/1967 |

(Continued)

*Primary Examiner* — David C Mellon
(74) *Attorney, Agent, or Firm* — Muncy, Geissler, Olds & Lowe, P.C.

(57) ABSTRACT

A particle separator includes a particle separation member to separate particles from liquid; a particle collection member for collecting particles from the particle separation member; and a liquid guiding member for guiding liquid flowing from the particle separation member to an outlet. The particle separation member includes an inlet for receiving un-clean liquid, a first separation section configured for preliminarily separating particles from the liquid, and a second separation section for separating further particles from liquid flowing from the first separation section. The second separation section includes a plurality of cyclones each having a wide open end connected to the first separation section and a narrow open end connected to the particle collection member.

18 Claims, 3 Drawing Sheets

(56) References Cited

U.S. PATENT DOCUMENTS

| | | | | |
|---|---|---|---|---|
| 4,544,486 | A | * | 10/1985 | Carroll ............... B01D 17/0217 209/411 |
| 4,587,024 | A | * | 5/1986 | Hayatdavoudi ............... 210/739 |
| 4,726,902 | A | | 2/1988 | Hubbard |
| 4,927,536 | A | * | 5/1990 | Worrell ..................... B04C 5/26 209/729 |
| 6,024,874 | A | * | 2/2000 | Lott .......................... B04C 5/13 209/138 |
| 6,582,600 | B1 | * | 6/2003 | Hashmi ................. B01D 17/00 209/729 |
| 6,596,169 | B1 | | 7/2003 | Rong et al. |
| 7,470,299 | B2 | | 12/2008 | Han et al. |
| 8,020,707 | B2 | | 9/2011 | Kim et al. |
| 8,568,500 | B2 | | 10/2013 | Han et al. |
| 2003/0029790 | A1 | * | 2/2003 | Templeton ................ 210/512.1 |
| 2004/0149667 | A1 | | 8/2004 | Meyer |
| 2005/0172586 | A1 | * | 8/2005 | Oh et al. ......................... 55/345 |
| 2006/0162299 | A1 | | 7/2006 | North |
| 2006/0230726 | A1 | * | 10/2006 | Oh ........................ A47L 9/1625 55/345 |
| 2007/0262033 | A1 | * | 11/2007 | Movafaghian et al. ....... 210/788 |
| 2010/0069217 | A1 | | 3/2010 | Aoki et al. |
| 2010/0213118 | A1 | | 8/2010 | Tandon |
| 2010/0237008 | A1 | * | 9/2010 | Goninan .................... 210/512.1 |
| 2010/0326895 | A1 | | 12/2010 | Mongadoddy et al. |
| 2011/0100923 | A1 | | 5/2011 | Jassal et al. |
| 2012/0000853 | A1 | * | 1/2012 | Tuteja et al. .................. 210/650 |

FOREIGN PATENT DOCUMENTS

| | | |
|---|---|---|
| GB | 2478155 A | 8/2011 |
| GB | 2502640 A | 12/2013 |
| GB | 2497944 B | 4/2014 |
| WO | WO 2008/155649 A1 | 12/2008 |
| WO | WO 2012/153097 A1 | 11/2012 |

\* cited by examiner

PARTICLE SEPARATOR

CROSS REFERENCE TO RELATED APPLICATIONS

This non-provisional patent application claims priority under 35 U.S.C. §119(a) from Patent Application No. 201110188389.3 filed in The People's Republic of China on Jul. 6, 2011.

FIELD OF THE INVENTION

This invention relates to a particle separation device and in particular, to a particle separator for water systems such as a domestic water supply system or central heating system.

BACKGROUND OF THE INVENTION

Big cyclonic separation devices are widely used in industry, such as used in oil refineries to separate oils and gases and used in swimming pools to separate particles from water, through vortex separation.

There are few small particle separation devices in the market. However, dirt, debris such as $Fe_2O_3$ and $Fe_3O_4$ and sludge already present in central heating systems as well as deposits from heat exchange will cause failure to a boiler system, especially the pump.

The objective of the present invention is to provide a new small particle separator for water systems such as a domestic water supply system or central heating system.

SUMMARY OF THE INVENTION

Accordingly, in one aspect thereof, the present invention provides a particle separator comprising: a particle separation member configured for separating particles from a liquid; a particle collection member in communication with the particle separation member configured for collecting particles from the particle separation member; and a liquid guiding member in communication with the particle separation member for guiding liquid from the particle separation member to an outlet of the device; wherein the particle separation member comprises an inlet for receiving liquid, a first separation section configured to preliminarily separate particles from the liquid flowing from the inlet, and a second separation section configured to separate further particles from the liquid flowing from the first separation section, the first separation section comprising a precipitator connected to the inlet, the second separation section comprising a plurality of cyclones each having a wide open end in communication with the first separation section and a narrow open end in communication with the particle collection member, and the precipitator is connected to the particle collection member.

Preferably, the first separation section further comprises a conical cavity with a wide open end connected to the precipitator and a narrow open end remote from the precipitator.

Preferably, a flow distribution member is connected between the first separation section and the second separation section, and the flow distribution section comprises a first cylindrical cavity connected to the narrow open end of the conical cavity, a plurality of second cylindrical cavities each connected to the wide open end of a corresponding cyclone, and a plurality of connecting channels each connecting a corresponding second cylindrical cavity with the first cylindrical cavity.

Preferably, a vortex finder is disposed coaxially in each second cylindrical cavity and communicates the respective second cylindrical cavity with the liquid guiding member.

Preferably, the vortex finder comprises a skirt section, the outer diameter of which increases in a direction away from the liquid guiding member.

Preferably, the connecting channels are arranged such that liquid is directed tangentially to the second cylindrical cavity.

Preferably, the inlet directs liquid tangentially to the precipitator.

Preferably, the liquid guiding member includes a chamber in communication with the second cylindrical cavities via the vortex finders, an outlet, and a guiding hub with a curved guiding surface disposed in the center of the chamber, the guiding surface facing the outlet and configured to guide liquid from the particle separation member toward the outlet.

Preferably, the particle collection member defines a through opening connected to the precipitator, and a drain opening, the axis of the drain opening being parallel to the axis of the precipitator, two valves being respectively disposed at the through opening and the drain opening.

Preferably, the two valves are integrally formed as a single unit.

Preferably, pressure sensors are disposed in the particle separation member and the liquid guiding member.

Preferably, a pH sensor is disposed in the liquid guiding member.

Preferably, the particle separation member is integrally formed as a single piece monolithic structure with a plurality of voids formed therein, the voids forming the conical cavity and the cyclones respectively.

Preferably, the particle separation member, liquid guiding member, and particle collection member are made from transparent or translucent materials.

Preferably, the particle separation member, liquid guiding member, and particle collection member are made from a thermally stable plastic material.

Preferably, surfaces of the materials for guiding liquid are modified with polymers selected from group of fluorodecyl polyhedral oligomeric silsesquioxanes.

Preferably, the materials are reinforced with mica particles, glass fibers or carbon micro- and nano-fibers.

According to a second aspect thereof, the present invention also provides a particle separator comprising: a particle separation member configured for separating particles from a liquid; a particle collection member in communication with the particle separation member, configured for collecting particles from the particle separation member; and a liquid guiding member in communication with the particle separation member for guiding liquid from the particle separation member to an outlet of the device; wherein the particle separation member comprises an inlet to allow liquid to flow into the device, and a plurality of cyclones each having a wide open end in communication with the liquid guiding member via a vortex finder and a narrow open end in communication with the particle collection member, the inlet being located outside of the particle collection member without passing through the particle collection member.

Preferably, the particle separation member is integrally formed as a single monolithic structure with a plurality of voids formed therein, the voids forming the cyclones.

Preferably, the particle separation member comprises a first separation section configured for preliminary separation of particles from the liquid, and a second separation section configured to separate further particles from the liquid flowing from the first separation section, the first separation section comprising a precipitator connected to the inlet, the second separation section comprising the cyclones, the precipitator being connected to the particle collection member via a valve.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 4 is a cross sectional view of the particle separator of FIG. 1, after it has been in use for a while.

DETAILED DESCRIPTION OF THE PREFERRED EMBODIMENTS

FIGS. 1 to 4 illustrate a particle separator according to a preferred embodiment of the present invention. The particle separator comprises a particle separation member 10 configured for separating particles from unclean liquid, a particle collection member 40 in communication with the particle separation member and configured for collecting particles separated from the liquid by the particle separation member 10, and a liquid guiding member 50 in communication with the particle separation member 10 configured for guiding cleaned liquid from the particle separation member 10 to an outlet 54 of the device. The liquid flows in a direction as indicated by arrows in FIG. 4.

Figure 1:
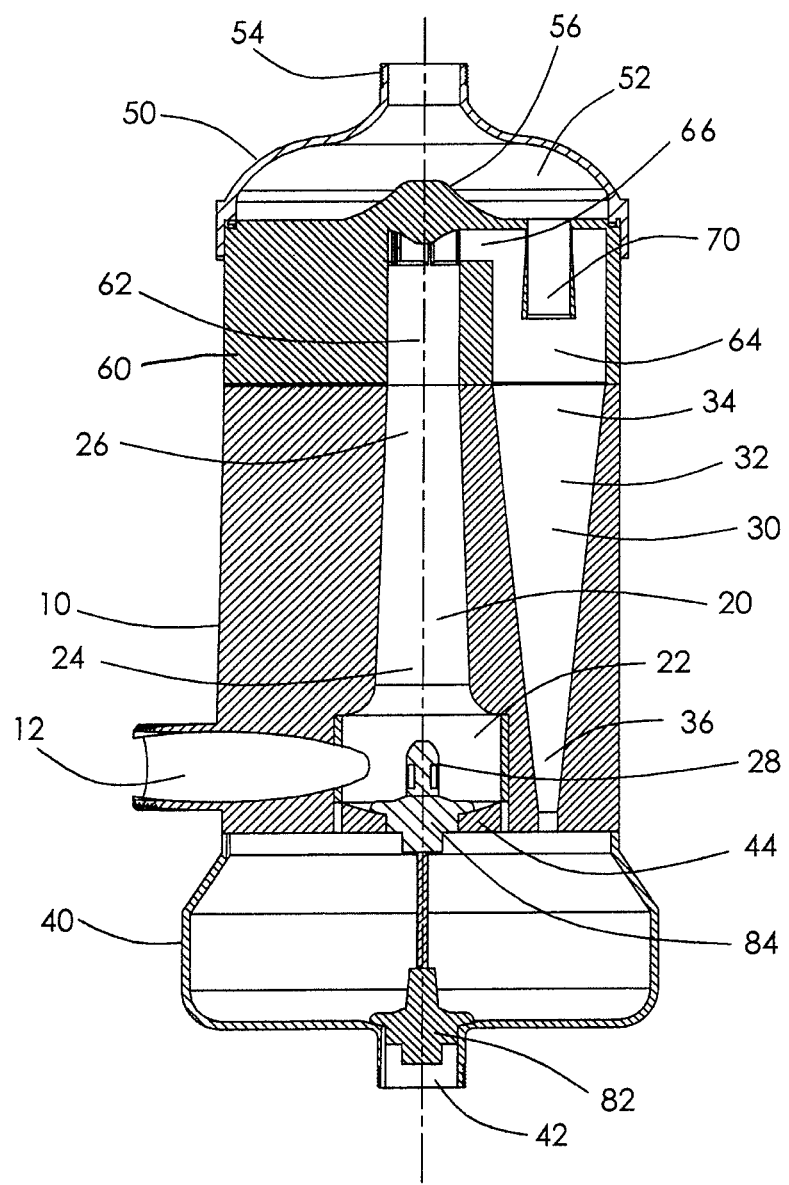
FIG. 1 is a cross sectional view of a particle separator in accordance with a preferred embodiment of the present invention.
Figure 2:
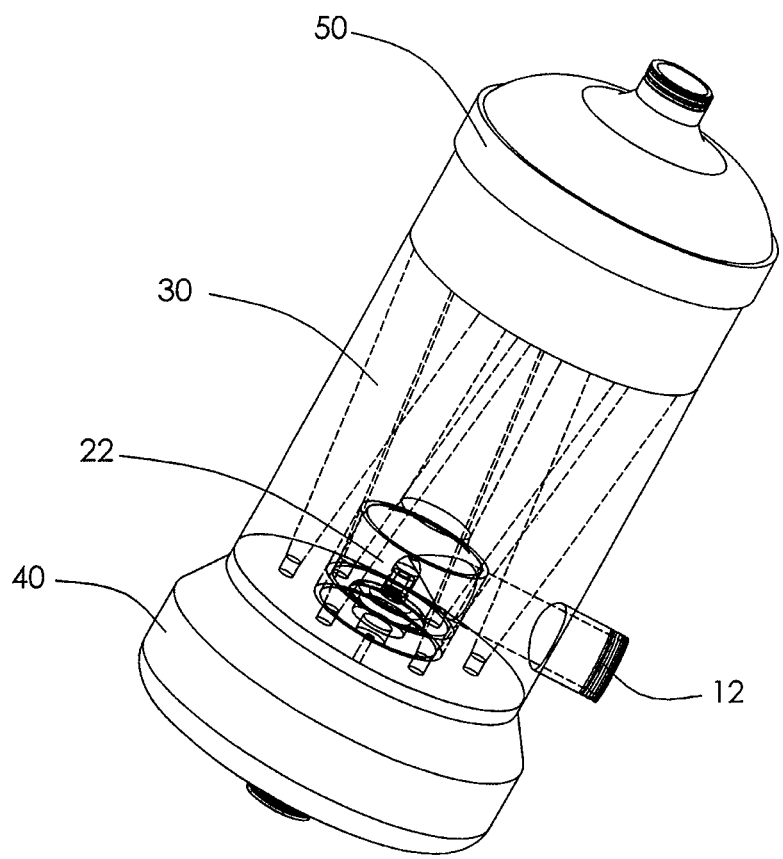
FIG. 2 illustrates the particle separator of FIG. 1.
Figure 3:
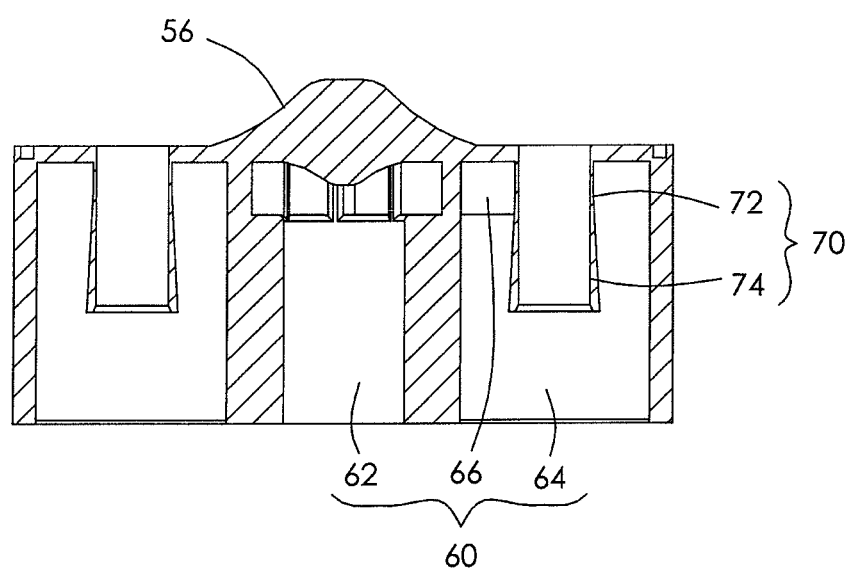
FIG. 3 is a cross sectional view of a liquid distribution member of the particle separator of FIG. 1.
Figure 4:
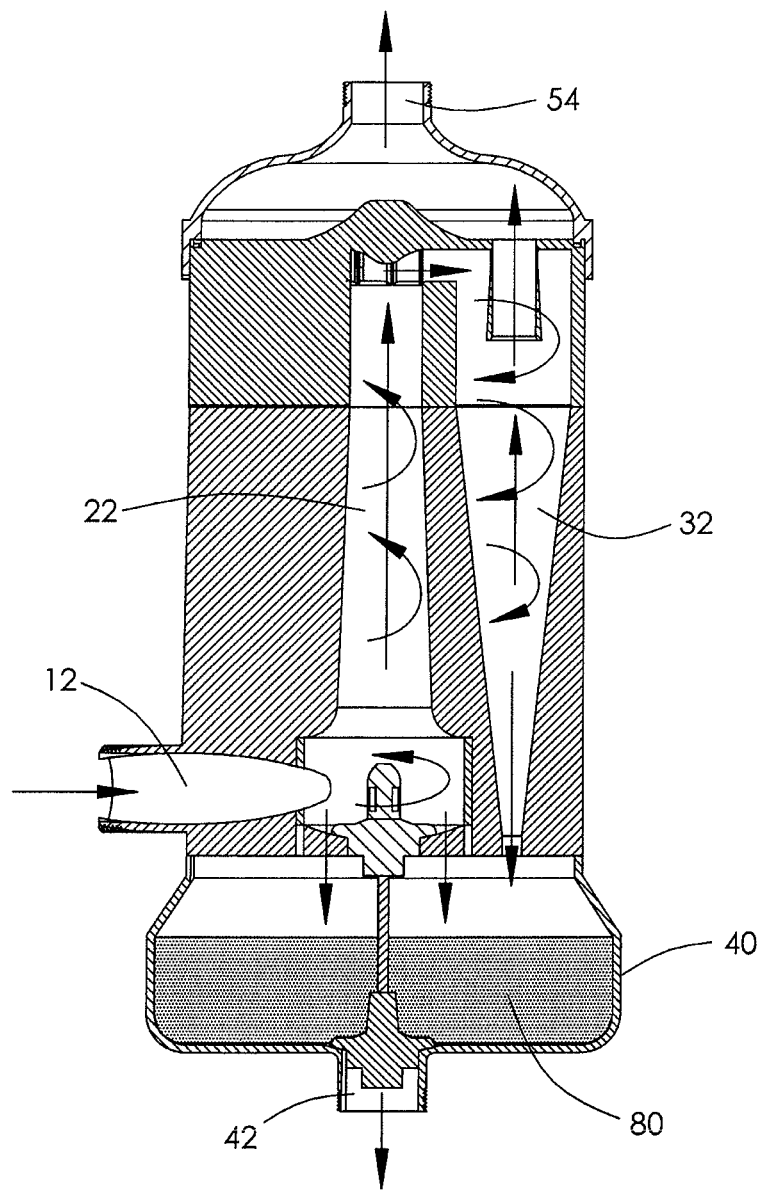

The particle separation member 10 has a cylindrical shape and comprises a liquid inlet 12 for receiving unclean liquid, a first separation section 20 configured for preliminarily separating particles from the unclean liquid, a second separation section 30 configured for separating further particles from the liquid from the first separation section 20. The inlet 12 is located at a bottom portion of the particle separation member 10 adjacent to the particle collection member 40. The first separation section 20 comprises a precipitator 22 connected to the inlet 12, and a conical cavity with a wide open end 24 connected with the precipitator 22, and a narrow open end 26. The inlet 12 is joined to the precipitator 22 in a tangential direction of the precipitator 22. When the liquid coming from the inlet 12 flows into the precipitator 22 it forms a whirlpool or vortex. The precipitator 22 has a vortex hub 28, which helps to maintain the vortex. As the liquid flows through the precipitator 22 and the conical cavity it flows a helical path and relatively heavier/bigger particles fall to the bottom of the precipitator 22 and finally fall into the particle collection member 40 via a through opening 44 formed between the precipitator 22 and the particle collection member 40. The particles collect here as shown in FIG. 4. Thus the liquid is preliminarily filtered before entering the second separation section 30. The minimum size of the particles separated by the first separation section 20 may be 1,000 μm (microns).

The second separation section 30 comprises a plurality of cyclones 32, each comprising a wide open end 34 and a narrow open end 36. The narrow open end 36 is connected to the particle collection member 40. The particle separator further comprises a liquid distribution member 60 which comprises a first cylindrical cavity 62 connected with the narrow open end 26 of the first particle separation section 20, a plurality of second cylindrical cavities 64 each connected with the wide open end 34 of a corresponding cyclone 32 of the second separation section, 30, and a plurality of connecting channels 66 each connecting a corresponding second cavity 64 with the first cavity 62. The connecting channels direct the flow of liquid tangentially into the second cavities to form a vortex flow in each second cavity. The second cavities stabilize the flow of liquid into the cyclones 32.

A vortex finder 70 is disposed in each cavity and forms a passageway between the respective second cavity 64 and the chamber 52 of the liquid guiding member 50. Each vortex finder 70 comprises a cylindrical mounting section 72 connecting the vortex finder to the liquid distribution member 60 and a skirt section 74. The outer diameter of the skirt section 74 increases gradually in a direction away from the mounting section 72, thereby reducing the volume of the cavity 64.

In operation, preliminarily filtered liquid from the first particle separation member 20 is distributed to the cyclones 32 of the second separation section 30 via the liquid distribution member 60. The liquid enters the second cavities 64 tangentially and forms a vortex within the cavity. The vortex is supported by the vortex finder 70 and the skirt section 74 accelerates the flow rate of the liquid. The vortex is maintained as the liquid enters the cyclones 32 via the wide open end 34. The liquid flows along a helical path toward the narrow open end 36 and then back to the wide open end 34 and finally enters the liquid guiding member 50 via the passageway through the vortex finders 70. As the liquid flows from the wide open end 34 to the narrow open end 36, particles 80 entrained in the liquid are thrown to the surfaces of the cyclones 32 under the influence of centrifugal force and fall to the narrow open end 36 under the influence of gravity and then into the particle collection member 40, where they are collected, as shown in FIG. 4. The minimum size of the particles 80 separated from the liquid in the cyclones 32 may be 5 μm.

The liquid guiding member 50 comprises a chamber 52 with an outlet 54. A guiding structure with a curved guiding surface 56 is formed at the centre of the chamber 52. The curved guiding surface 56 faces the outlet 54 for guiding cleaned liquid to the outlet 54.

The particle collection member 40 has a drain opening 42 for draining particles, and a through opening 44 communicating the precipitator 22 of the particle separation member 10 with the particle collection member 40. Valves 82, 84 are respectively arranged at the openings 42, 44 for selectively closing or opening the openings 42, 44. In this embodiment, the vortex hub 28 is formed at the valve 84. Preferably, the valves 82, 84 are formed as a single unit and operated to open or close the openings 42, 44 simultaneously. Preferably, the drain opening 42 is located at the bottom of the particle collection member 40 and the axis of the drain opening 42 is parallel to the axis of the first cavity 20. When the valves 82, 84 are open, liquid may flow from the inlet 12 into the particle collection member 40 to clean the particle collection member 40. Alternatively, the valves 82, 84 may be two separate valves.

In the preferred embodiment, the first and second particle separation sections 20, 30 are integrally formed as a single part, optionally as a single monolithic molding, with a plurality of voids formed therein. The voids respectively form the cavity and cyclones 32. The integrally formed first and second particle separation sections 20, 30 have good rigidity to minimize vibration when liquid flows there through.

Preferably, the particle separation member 10, particle collection member 40, liquid guiding member 50 and the liquid distribution member 60 are made of transparent or translucent material such that inside of the particle separator is visible. It is particularly useful if the particle collection member is transparent or translucent so that the volume of particles collected can be readily seen to determine if the particle collection member needs to be emptied. In this embodiment, the particle separation member 10, particle collection member 40, liquid guiding member 50 and the liquid distribution member 60 are made of thermally stabilized plastic. Thus, the particle separator may be used to filter hot water as well as cool and cold water. Preferably, the materials are reinforced with mica particles, glass fibers or carbon micro and nano-fibers. Preferably, surfaces of the materials for guiding liquid are modified with polymers selected from group of fluorodecyl polyhedral oligomeric silsesquioxanes for better efficiency.

Alternatively, the particle separation member 10, particle collection member 40, liquid guiding member 50 and the liquid distribution member 60 may be made of metal.

Preferably, pH sensors or pressure sensors may be disposed inside the chamber 52 of the liquid guiding member 50. Pressure sensors may be disposed inside of the particle separation member 10. The pH sensors may monitor the condition of the liquid in the system while the pressure sensors may give an indication that the particle separator needs cleaning or that there is a blockage in the system.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A particle separator comprising:
    a particle separation member configured for separating particles from a liquid;
    a particle collection member in communication with the particle separation member configured for collecting particles from the particle separation member; and
    a liquid guiding member in communication with the particle separation member for guiding liquid from the particle separation member to an outlet;
    wherein the particle separation member comprises an inlet for receiving liquid, a first separation section configured to preliminarily separate particles from the liquid flowing from the inlet, and a second separation section configured to separate further particles from the liquid flowing from the first separation section, the first separation section comprising a precipitator connected directly to the inlet, the second separation section comprising a plurality of cyclones each having a wide open end in communication with the first separation section and a narrow open end in communication with the particle collection member, and the precipitator is connected to the particle collection member,
    wherein the first separation section further comprises a conical cavity located between the precipitator and the second separation section, the conical cavity having a wide open end connected to the precipitator and a narrow open end remote from the precipitator, the wide open end being closer to the inlet than the narrow open end,
    wherein when the liquid flows through the precipitator and the conical cavity the liquid flows in a helical path and relatively heavier/bigger particles fall to a bottom of the precipitator and then into the particle collection member to thereby preliminarily separate particles from the liquid.

2. The particle separator of claim 1, further comprising a flow distribution member connected between the first separation section and the second separation section, wherein the flow distribution section comprises a first cylindrical cavity connected to the narrow open end of the conical cavity, a plurality of second cylindrical cavities each connected to the wide open end of a corresponding cyclone, and a plurality of connecting channels each connecting a corresponding second cylindrical cavity with the first cylindrical cavity.

3. The particle separator of claim 2, wherein a vortex finder is disposed coaxially in each second cylindrical cavity and communicates the respective second cylindrical cavity with the liquid guiding member.

4. The particle separator of claim 3, wherein the vortex finder comprises a skirt section, the outer diameter of which increases in a direction away from the liquid guiding member.

5. The particle separator of claim 2, wherein the connecting channels are arranged such that liquid is directed tangentially to the second cylindrical cavity.

6. The particle separator of claim 1, wherein the inlet directs liquid tangentially to the precipitator.

7. The particle separator of claim 3, wherein the liquid guiding member includes a chamber in communication with the second cylindrical cavities via the vortex finders, an outlet, and a guiding hub with a curved guiding surface disposed in the center of the chamber, the guiding surface facing the outlet and configured to guide liquid from the particle separation member toward the outlet.

8. The particle separator of claim 1, wherein the particle collection member defines a through opening connected to the precipitator, and a drain opening, the axis of the drain opening being parallel to the axis of the precipitator, two valves being respectively disposed at the through opening and the drain opening.

9. The particle separator of claim 8, wherein the two valves are integrally formed as a single unit.

10. The particle separator of claim 1, wherein the particle separation member is integrally formed as a single piece monolithic structure with a plurality of voids formed therein, the voids forming the conical cavity and the cyclones respectively.

11. The particle separator of claim 1, wherein the particle separation member, liquid guiding member, and particle collection member are made from transparent or translucent materials.

12. The particle separator of claim 1, wherein the particle separation member, liquid guiding member, and particle collection member are made from a thermally stable plastic material.

13. The particle separator of claim 12, wherein surfaces of the thermally stable plastic are modified with polymers selected from group of fluorodecyl polyhedral oligomeric silsesquioxanes.

14. The particle separator of claim 12, wherein the thermally stable plastic material are reinforced with mica particles, glass fibers or carbon micro- and nano-fibers.

15. The particle separator of claim 1, wherein the outlet is located at a top end of the separator and a drain is located at a bottom end of the separator and connected to the particle collection member.

16. A particle separator comprising:
- a particle separation member configured for separating particles from a liquid;
- a particle collection member in communication with the particle separation member, configured for collecting particles from the particle separation member; and
- a liquid guiding member in communication with the particle separation member for guiding liquid from the particle separation member to an outlet;
- wherein the particle separation member comprises an inlet for receiving liquid, a first separation section configured to preliminarily separate particles from the liquid flowing from the inlet, and a second separation section configured to separate further particles from the liquid flowing from the first separation section, the first separation section comprising a precipitator connected directly to the inlet such that when the liquid coming from the inlet flows into the precipitator it forms a whirlpool or vortex, the precipitator being connected to the particle collection member via a valve such that particles are capable of falling to the particle collection member when the valve is open,
- wherein the second separation section comprises a plurality of cyclones each having a wide open end in communication with the liquid guiding member via a vortex finder and a narrow open end in communication with the particle collection member, the inlet being located outside of the particle collection member without passing through the particle collection member.

17. The particle separator of claim 16, wherein the particle separation member is integrally formed as a single monolithic structure with a plurality of voids formed therein, the voids forming the cyclones.

18. The particle separator of claim 16, wherein a vortex hub is formed at the valve.

* * * * *